United States Patent [19]

Clark et al.

[11] 4,287,035

[45] Sep. 1, 1981

[54] METHOD FOR PRODUCING RAPID PH CHANGES

[75] Inventors: John H. Clark; Anthony J. Campillo; Stanley L. Shapiro; Kenneth R. Winn, all of Los Alamos, N. Mex.

[73] Assignee: The United States of America as represented by the United States Department of Energy, Washington, D.C.

[21] Appl. No.: 42,163

[22] Filed: May 24, 1979

[51] Int. Cl.$^3$ ............................................. B01J 19/12
[52] U.S. Cl. ........................................... 204/157.1 R
[58] Field of Search ................... 204/157.1 R, 158 R, 204/157.1 C, 158 L, 158 N, 158 T

[56] References Cited

U.S. PATENT DOCUMENTS

| 2,734,027 | 2/1956 | Nickerson et al. | 204/158 R |
| 3,649,493 | 3/1972 | Meiners et al. | 204/158 R |

OTHER PUBLICATIONS

Ireland et al., "Acid–Base Properties of Electronically Excited States of Organic Molecules," in Advances of Physical Organic Chemistry, vol. 12, pp. 131–221, (1976).

Primary Examiner—Howard S. Williams
Attorney, Agent, or Firm—Edward C. Walterscheid; Paul D. Gaetjens; James E. Denny

[57] ABSTRACT

A method of initiating a rapid pH change in a solution by irradiating the solution with an intense flux of electromagnetic radiation of a frequency which produces a substantial pK change to a compound in solution. To optimize the resulting pH change, the compound being irradiated in solution should have an excited state lifetime substantially longer than the time required to establish an excited state acid-base equilibrium in the solution. Desired pH changes can be accomplished in nanoseconds or less by means of picosecond pulses of laser radiation.

3 Claims, 5 Drawing Figures

METHOD FOR PRODUCING RAPID PH CHANGES

BACKGROUND OF THE INVENTION

The invention described herein relates to a method for producing rapid pH changes in solution and more particularly to a method wherein the rapid pH change is produced by irradiating the solution with an intense flux of light of the desired frequency. It is a result of a contract with the Department of Energy.

In terms of both the chemical insight gained and the predictive power provided, the concept of acids and bases must surely be one of the most general in all of chemistry. According to the Brønsted-Lowry definition, an acid is a compound which is a proton donor, whereas a base accepts protons from solution. For acids and bases in protic solvents, acid-base chemistry becomes the chemistry of the proton. Since the proton has no electron cloud, its ionic size is about $10^{-6}$ nm, making it unique among cations, the rest of which are at least $10^5$ times larger. Consequently, the proton is very reactive, since it can closely approach and highly polarize molecules and chemical bonds.

It is not surprising therefore that the majority of solution phase reactions, including most reactions of biological importance, are either acid- or base-catalyzed. Unfortunately, the exceedingly rapid rates typical of most proton transfer reactions make it quite difficult to study such acid-base chemistry by conventional techniques. While picosecond laser spectroscopy provides a general method for the study of proton-transfer reactions, it would be most useful to have some means of controlling the rapid initiation of such reactions in order to properly understand their mechanisms and kinetics.

Since the rate of proton transfer reactions is obviously influenced by the number of protons or hydrogen ions present in the solution, it is apparent that a means of rapidly changing the hydrogen ion content of the solution would offer a general, widely applicable method for rapid initiation of solution phase chemistry. A convenient means of expressing hydrogen ion concentration without the use of negative exponents is the pH scale. A rapid change in pH then is a measure of a rapid change in hydrogen ion (proton) concentration.

Accordingly, it is a general object of the invention to provide a method for rapidly changing the pH of a solution.

Another object is to provide such rapid pH change without the use of additional reagents.

Yet another object of the invention is to provide a degree of control over the amount of the pH change which occurs in the solution.

Other objects, advantages and novel features of the invention will become apparent to those skilled in the art upon examination of the following detailed description of a preferred embodiment of the invention and the accompanying drawings.

SUMMARY OF THE INVENTION

We have found that a rapid pH change can be initiated in solution by irradiating the solution with an intense flux of electromagnetic radiation of a frequency which produces a substantial pK change to a compound in the solution. In its broad scope, our invention encompasses a method for rapidly changing the pH of a solution which comprises the formation of a solution of a compound selected from those which exhibit substantial shifts in pK values when electronically excited by electromagnetic radiation of an appropriate frequency, and irradiation of the solution by such electromagnetic radiation having an intensity sufficient to produce the concentration of excited state species required for the desired pH change.

In a preferred embodiment the compound being irradiated in solution has an excited state lifetime substantially longer than the time required to establish an excited state acid-base equilibrium in the solution. In this embodiment, the intensity and length of the electromagnetic irradiation is influenced by the excited state lifetime of the compound being irradiated. Thus, if the excited state lifetime is long, the intensity of the irradiation may be less with the irradiation pulse longer, whereas if the excited state lifetime is shorter, then the irradiation pulse must also be more intense and shorter to produce the equivalent pH change.

Finally, the degree of the pH change is affected not only by the intensity of the radiation but also by the concentration of the compound undergoing the proton transfer reaction. A desired initial pH of the solution before irradiation can be obtained through the addition of appropriate amounts of a strong acid or base.

DETAILED DESCRIPTION OF THE INVENTION

An even broader definition of acids and bases than the Brønsted-Lowry definition set forth earlier in this specification is that of Lewis, namely, that an acid is an electron pair accepting species while a base is electron pair donating. The Lewis definition clearly implies a link between the acid base properties of a molecule and its electronic structure. Thus, a change in electronic structure, say by electronic excitation, should produce a concomitant change in acid-base properties. Electronic excitation may readily be produced by irradiation with electromagnetic radiation of a suitable frequency.

In order to ascertain the nature of the effect of such irradiation on the acid-base properties of the molecule, consider the typical reversible acid reaction:

$$AH + H_2O \rightleftharpoons A^- + H_3O^+ \tag{1}$$

Here, AH is an acid that gives up a proton to water to form a hydronium ion, $H_3O^+$, and an anion, $A^-$. In this case, the pH of the solution is simply $-\log_{10}[H_3O^+]$, where the bracket indicates the concentration in moles per liter. Thus, a pH of 2 indicates that the concentration of hydronium ion is $10^{-2}$ moles/liter.

Now reaction (1) has a characteristic equilibrium constant, K, defined as:

$$K = \frac{[A^-][H_3O^+]}{[AH]}. \quad (2)$$

If the amount of one constituent is varied, the others will adjust to keep K constant. A useful shorthand for indicating the strength of an acid or base is pK, defined as $-\log_{10} K$. For reaction (1), a pK of 8 indicates a weak acid, whereas a pK of 1 shows a strong acid. Physically, when the pH of a solution is adjusted so that it equals the pK of the acid, then $[AH]=[A^-]$.

It is well known that in a wide variety of compounds there is a change in acid and base strength, i.e., of pK, when the compounds are electronically excited. Whey this is so is perhaps best explained in terms of the following discussion which is taken from J. F. Ireland et al., "Acid-Base Properties of Electronically Excited States of Organic Molecules," Advances in Physical Organic Chemistry, vol. 12, pp. 131-221 (Academic Press 1976).

Where chemical processes such as protonation are concerned, it is the general rule that only the first excited singlet state ($S_1$) and the first excited triplet state ($T_1$) are involved. Although there are exceptions, the general rule follows from the fact that in many, perhaps most, instances protonation is in competition with emission so that their rates are similar. A much shorter time ($\sim 10^{-12}$ sec) is required for the $S_1$ state to be reached from the higher states produced immediately on absorption of electromagnetic radiation than for radiative and chemical changes to occur ($10^{-8}$ sec or longer).

Figure 1:
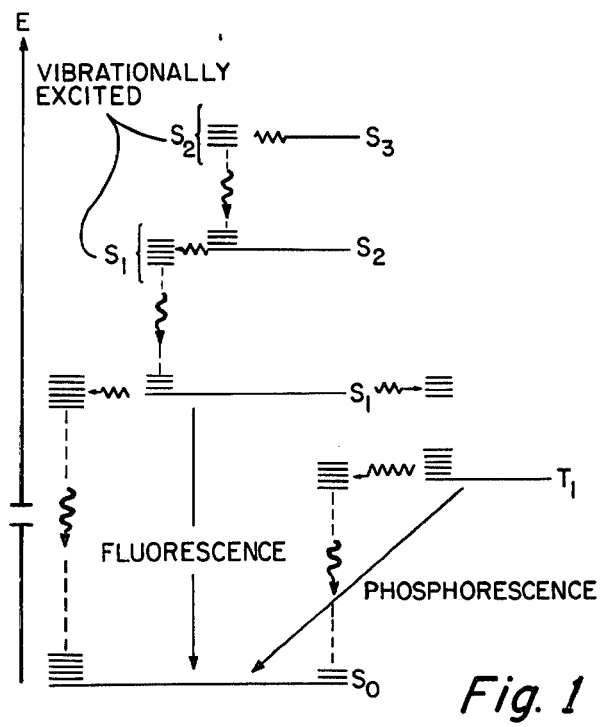
FIG. 1 is a schematic representation of radiative and radiationless decay processes in excited polyatomic molecules.

The common pattern for compounds undergoing electronic excitation can be summarized as follows. In the ground state the AH and $A^-$ (for bases, it would be the B and $BH^+$) species have all their electrons paired in the lowest molecular orbitals and are therefore in their lowest singlet states, $S_0$. On absorption of radiation, an electron is pictured as being promoted, without change of spin, to higher levels, $S_1$, $S_2$, etc., which are also usually vibrationally excited in a way that depends on the relationship of the geometry of the higher electronic state to $S_0$, i.e., on the Franck-Condon principle or the wave function overlap between the states. At room temperature, within about $10^{-12}$ sec the molecule settles down in the lowest vibrational level of the $S_1$ state by internal conversion. From $S_1$ it either emits fluorescence or, in the absence of any sufficiently rapid chemical changes, undergoes further internal conversion to $S_0$ by a radiationless process (at a rate which is slower than $S_2 \rightarrow S_1$, $S_3 \rightarrow S_2$, etc., because of the much larger electronic energy difference between $S_1$ and $S_0$). There is also usually time for the electron in the excited orbital to change its spin and thus to produce a vibrationally excited form of $T_1$ by intersystem crossing. After that, phosphorescence or radiationless conversion to the ground state (or further chemical reaction) may occur, but the rates of these spin-forbidden processes are generally much slower than the corresponding $S_1$ changes. These primary photophysical processes are summarized in FIG. 1.

The importance of changes in acid and base strength on excitation is readily evidenced by considering the simple indicator equilibrium set forth in Eq. (3).

$$In^- + H_3O^+ \rightleftharpoons InH + H_2O. \quad (3)$$

For InH to act as an indicator, it must absorb at a different frequency after deprotonation. Suppose that $In^-$ absorbs at a higher frequency than InH. If the pH of the solution is equal to the ground state pK so that $[In^-]=[InH]$, then upon excitation $In^-$ will be at a higher energy level than excited InH and will then (apart from relatively minor entropy effects) exhibit a strong tendency to change to InH. In other words, it will become a stronger base. If InH absorbs at a higher frequency than $In^-$, then InH will become a stronger acid on excitation.

At 300 nm, near where many molecules of interest absorb, the frequency is $10^{15}$/sec, corresponding to about 400 kJ/mole. Thus a 30 nm shift in spectrum between InH and $In^-$ corresponds to about 40 kJ/mole which makes a change of 7 units in pK. Since changes of 30 nm or more in excitation frequency are common on protonation, it is quite usual to find that the acid dissociation constant of a protonated compound changes by between 6 and 10 powers of ten after absorption of light.

As shown by the data of the tables set forth in Ireland et al., the phenomenon is quite general and is characteristic of bases as well as acids. Ireland et al. is hereby incorporated by reference. Values of pK for representative molecules in the ground state ($S_0$) and the first excited singlet state ($S_1$) are given in Table I. Deprotonation results in increased acidity whereas protonation increases the basicity of the solution. For example, 2-naphthol-6-sulfonate is a weak base in its ground state but a strong acid in its first excited singlet state, showing a pK change of 7. Phenanthrene, on the other hand, becomes less acidic (more basic) in the excited state. The change in pK may be quite large. Thus, for example, the aromatic hydrocarbon fluorene exhibits a pK change of 29 upon excitation.

TABLE I

| Compound | pK ($S_0$) | pK ($S_1$) |
|---|---|---|
| 2-Naphthol | 9.5 | 2.5 |
| 2-Naphthol-6-Sulfonate | 9.1 | 1.9 |
| Phenanthrene | −3.5 | 19.5 |
| Phenol | 10.0 | 3.6 |
| Azobenzene | −2.9 | 13.7 |
| Acridine | 5.5 | 10.6 |
| Chalcone | −5.0 | 7.1 |
| Fluorene | 20.5 | −8.5 |

Intense, very short (e.g., picosecond) pulses of radiation allow considerable concentrations of electronically excited molecules to be prepared. As a result, appreciable changes in the concentration of $H^+$ (or $H_3O^+$), and by definition pH, can be brought about on a very rapid time scale, e.g., nanoseconds. It should be noted, however, that while a change in pK on excitation is a necessary condition for pH modulation, it is not necessarily sufficient to produce a large change in the pH.

Consider the situation wherein the proton transfer time for either protonation or deprotonation is longer than the excited state lifetime of the molecules in question. In this situation, it is not possible to achieve an acid-base equilibrium during the excited state lifetime. As a result, some of the photons that could be used to produce protons under acid-base equilibrium conditions are no longer available for this purpose because the excitation produced by them is lost in various decay processes from the excited state (see FIG. 1). It will be apparent therefore, that to maximize the pH change for a particular concentration and radiation fluence, it is highly desirable that the proton transfer time be substantially shorter than the excited state lifetime.

The proton transfer time, and hence the acid-base equilibrium, is a characteristic of the particular compound being electronically excited, and varies from compound to compound. It can, however, be readily determined for any compound of interest by means of time resolved spectroscopy of species in the solution. In the case of an acid reaction of the type shown in reaction (1), these would be the acid AH and the anion $A^-$. Such spectroscopy permits the concentrations of these species to be ascertained. From these concentrations, the rate constants, and hence the proton transfer time, can be obtained, using methods well known in chemical kinetics.

The requisite spectroscopic measurements are quite straightforward if (a) the excited states of both AH and $A^-$ fluoresce, (b) the fluorescence from the excited states of AH and $A^-$ is sufficiently spectrally shifted that they can be distinguished from one another, and (c) excited state protonation and deprotonation occur with retention of the electronic excitation. As demonstrated by the wide variety of compounds set forth in Ireland et al., these criteria are met for many compounds. In those instances where they are not met it is still possible to obtain the necessary information by means of various techniques well known to those versed in the spectroscopic arts. Thus, for example, lack of fluorescence from the excited states of AH and $A^-$ can be overcome by probing with excited-state absorption spectroscopy rather than emission spectroscopy.

A comparison of the excited state characteristics of the two compounds 2-naphthol-6-sulfonate and 2-naphthol demonstrates the relationship between proton transfer time, excited state lifetime, and the change in pH. In 2-naphthol-6-sulfonate the proton transfer occurs in less than $1 \times 10^{-9}$ sec, while the excited state lifetime is $10 \times 10^{-9}$ sec. Thus, excited state acid-base equilibrium is achieved before the excited state population decays, and the excited state pK can be fully exploited to produce a large pH change. In 2-naphthol, however, the excited state lifetime is $\sim 6 \times 10^{-9}$ sec, while the proton transfer time is $20 \times 10^{-9}$ sec, so that acid-base equilibrium cannot be achieved during the excited state lifetime. Accordingly, although the change in pK value on electronic excitation is nearly as large for 2-naphthol as it is for 2-naphthol-6-sulfonate, 2-naphthol-6-sulfonate can be used to produce large and very rapid pH modulation, whereas 2-naphthol cannot.

The point here is that while a pH change does occur with 2-naphthol, the amount of the change is substantially less than that which can be achieved with 2-naphthol-6-sulfonate because no excited state acid-base equilibrium can be obtained before decay of the excited state begins.

The pH change produced by the excitation can relax no faster than the excited state lifetime. It is therefore readily apparent that longer lasting pH changes can be obtained through the use of compounds which have longer excited state lifetimes than do the naphthols just discussed. Examples of compounds with comparably very much longer excited state lifetimes are benzophenone and xanthone which have triplet state lifetimes on the order of several to tens of milliseconds.

Alternatively, the time over which the pH change exists can be extended by using sequenced excitation sources to maintain the excited state. Moreover, through use of excitation sources operating at different wavelengths and through use of different compounds in the solution, the pH change may be varied from one level to another. Through this technique, the pH may be brought to a desired level and then after a predetermined time reversed rapidly to the original level, thereby producing the pH equivalent of a square wave.

For reasons which will become clearer later in this specification, it may be desirable to set the initial pH of the solution at some desired level other than that established by the natural room temperature acid-base equilibrium of the compound undergoing electronic excitation. This is easily accomplished by addition of an appropriate amount of a strong acid or a strong base. As used here, a strong acid or strong base is one which is essentially completely dissociated in solution at room temperature.

For convenience of description in the remainder of this specification, the rapid pH change produced in accordance with the method of the invention will be defined as a pH jump, while the electronically excited compounds undergoing the protonation or deprotonation reaction will be termed jump compounds, molecules, or species.

Figure 2:
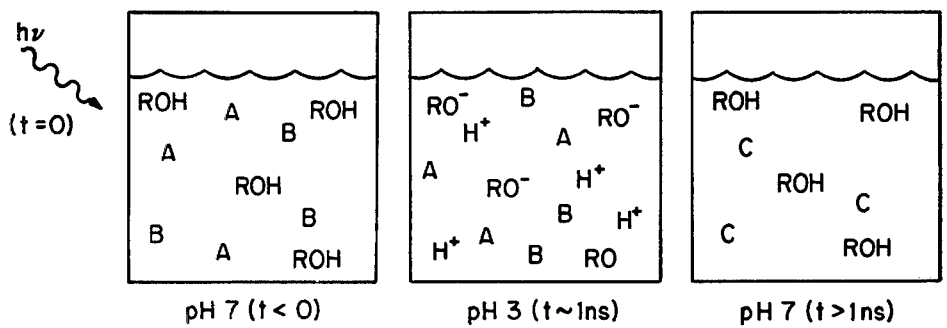
FIG. 2 is a schematic depiction of the use of the pH jump technique of this invention to initiate an electronic ground state acid-base catalyzed reaction.

The utility of the pH jump is manyfold. For example, the change in solution pH produced by the jump allows other ground state acid-base catalyzed reactions to be initiated as shown schematically in FIG. 2. In FIG. 2, ROH represents the jump molecule species in a solution at pH 7, whereas A and B are molecules which react in an acid catalyzed reaction to form molecular species C. It is apparent that ROH should not be reactive with A, B, or C in either the ground or the excited state. At pH 7 very little of C is formed. At t=0, ROH is excited by an ultraviolet laser pulse and very quickly ($<1$ nsec) deprotonates. As a result, at a time of about 1 nsec after the pulse a substantial increase in hydrogen ion concentration has occurred so that the pH is now 3. It remains at this level as long as $RO^-$ remains excited. At pH 3, however, molecular species C is quickly formed. At some later time, depending on whether the irradiation continues and the excited state lifetime, $RO^-$ returns to its ground state, is protonated, and the pH of the solution returns to 7. The net result is that a reaction which is not photochemical in nature can be initiated using a laser.

The ubiquitous nature of acid-base catalysis means that there are many such reactions to choose from. For example, in dehydration:

$$ROH_2^+ \rightarrow R^+ + H_2O \qquad (4)$$

is easier than

$$ROH \rightarrow R^+ + OH^-. \qquad (5)$$

The addition of a proton can often facilitate a further proton transfer, e.g.:

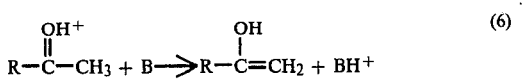

(6)

is easier than

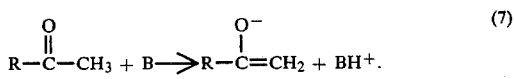

(7)

Nucleophilic addition reactions are also often acid-catalyzed, since

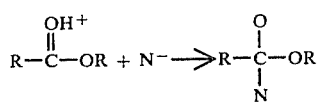 (8)

is easier than

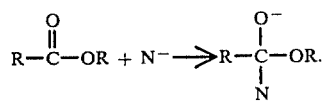 (9)

The pH jump used in conjunction with indicator dyes has utility in a variety of optical devices. Indicator dyes have optical properties (colors) which are extremely sensitive to pH. They are thus useful in providing a spectroscopic means to indicated the hydrogen ion concentration of a solution. The typical indicator can exist in protonated and deprotonated forms in accordance with the simple equilibrium set forth in reaction (3). Each of these forms exhibits a characteristic color.

For a dye like bromothymol blue, InH is yellow while In$^-$ is blue. The color at a particular pH is simply a superposition of the two forms. Consequently, a solution that at pH 7 does not transmit red light can be made to "switch" or "gate" red light with the appropriate pH jump. With the compounds discussed generally in this specification, the "gating" can be made to occur quite rapidly, i.e., in a few nanoseconds or less. If intramolecular systems are used, it may be possible to achieve subpicosecond switching. Furthermore, an optical device based on the pH jump can be designed to switch fron nearly 0% transmission to 100% transmission. This switching occurs irrespective of polarization and in a manner that is relatively insensitive to the intensity of the switching pulse in the normal operating regime. As an optical shutter a device of this type compares favorably in certain respects with the optical Kerr gate. The pH jump also has general applicability when used with indicator dyes in a pulse shaper, or as a means to produce transient gratings or for phase matching in nonlinear optical processes in liquids.

Finally, it should be emphasized that the pH jump permits the kinetics of ground state, acid-base catalyzed reactions to be analyzed in a manner and detail that heretofore has not been possible. It provides an excellent technique for probing the dynamics of biological membranes since a very fast proton motive force can be established across the membrane by jumping the pH on one or the other side.

A wide variety of functional groups are capable of undergoing proton transfer reactions on electronic excitation. Table II provides representative samples of such groups, the direction of the pK change, and the amount of the change in a representative compound. Molecules with a negative $\Delta pK$ become stronger acids (weaker bases) in the excited state and those with a positive $\Delta pk$ stronger bases (weaker acids).

Figure 3:
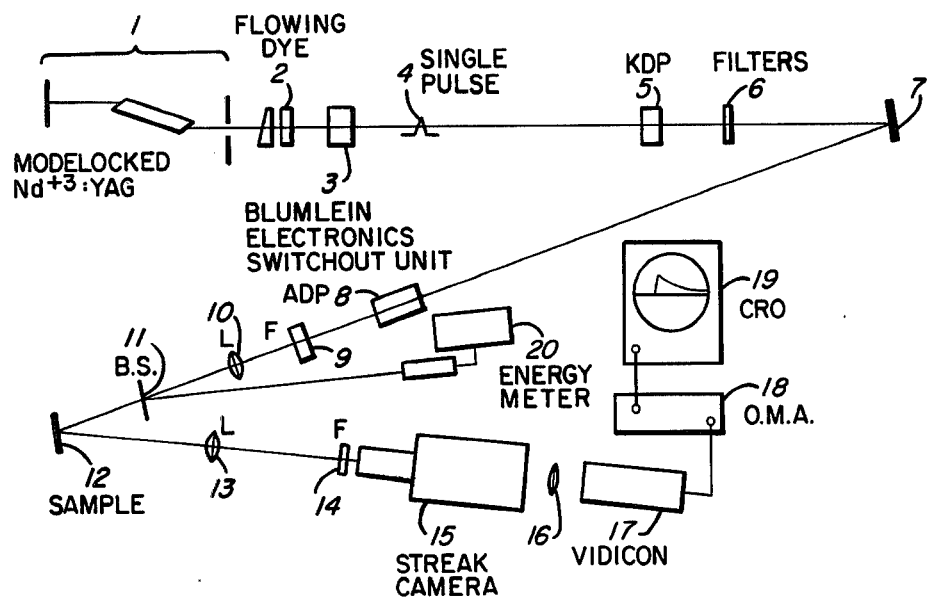
FIG. 3 is a schematic of apparatus used to produce a rapid pH change in an aqueous solution of 2-naphthol-6-sulfonate and to record data with respect thereto.

Using the apparatus set forth schematically in FIG. 3, pH jumps in which the solution becomes more acidic can readily be demonstrated using the jump molecule 2-naphthol-6-sulfonate. A single 30 psec pulse 4 at 1064 nm is extracted from the pulse train of mode-locked Nd:YAG laser 1 by means of Blumlein electronic switchout unit 3. The flowing dye 2 serves to mode lock laser 1. A second harmonic of pulse 4 is generated at 532 nm in KDP crystal 5.

TABLE II

| Reaction | $pK(S_1) - pK(S_0)$ | Example | R |
|---|---|---|---|
| $-OH \rightleftharpoons -O^- + H^+$ | Negative | 1-Naphthol $pK(S_0) = 9.2, pK(S_1) = 2.0$ | |
| $-NH_2 \rightleftharpoons -NH^- + H^+$ | Negative | 2-Naphthylamine $pK(S_0) \geq 14, pK(S_1) = 12.2$ | |
| $-NH_3^+ \rightleftharpoons -NH_2 + H^+$ | Negative | 2-Naphthylamine $pK(S_0) = 4.1, pK(S_1) = -1.5$ | |
| $\diagdown C=OH^+ \rightleftharpoons \diagdown C=O + H^+$ | Positive | Xanthone $pK(S_0) = -4.1, pK(S_1) = 1.0$ | |
| $-CO_2H \rightleftharpoons -CO_2^- + H^+$ | Positive | 1-Naphthoic acid $pK(S_0) = 3.7, pK(S_1) = 7.7$ | |
| $-CO_2H_2^+ \rightleftharpoons -CO_2H + H^+$ | Positive | 1-Naphthoic acid $pK(S_0) = -7.7, pK(S_1) = 2.0$ | |
| $-SO_3H_2^+ \rightleftharpoons -SO_3H + H^+$ | Positive | 1-Naphthalenesulphonic acid $pK(S_0) = -10.6, pK(S_1) = -3.7$ | |
| $-PO_3H_3^+ \rightleftharpoons -PO_3H_2 + H^+$ | Positive | Phenylphosphonic acid $pK(S_0) = -6.3, pK(S_1) = -2.2$ | |
| $-AsO_3H_3^+ \rightleftharpoons -AsO_3H_2 + H^+$ | Positive | Phenylarsonic acid $pK(S_0) = -5.9, pK(S_1) = -2.1$ | |
| $-NO_2H^+ \rightleftharpoons -NO_2 + H^+$ | Positive | Nitrobenzene $pK(S_0) = -11.3, pK(S_1) = 2.3$ | |
| $Ar\diagdown NH^+ \rightleftharpoons Ar\diagdown N + H^+$ | Positive | Acridine $pK(S_0) = 5.5, pK(S_1) = 10.6$ | |
| $\diagdown C-H \rightleftharpoons \diagdown C^- + H^+$ | Negative | Fluorene $pK(S_0) = 20.5, pK(S_1) = -8.5$ | |

TABLE II-continued

| Reaction | pK(S₁)−pK(S₀) | Example | R |
|---|---|---|---|
| 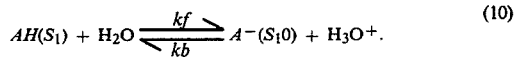 | Positive | Naphthalene | $pK(S_0) = -4.0$, $pK(S_1) = 11.7$ |
| $-N{=}N- \rightleftharpoons -N{=}N- + H^+$<br>$\phantom{xxx}H^+$ | Positive | Azobenzene | $pK(S_0) = -2.90$, $pK(S_1) = 13.7$ |

Wavelengths other than 532 nm are then removed from pulse 4 by means of spectral filters 6. The 532 nm pulse is reflected from mirror 7 through ADP crystal 8 where it in turn is frequency doubled to produce the fourth harmonic at 266 nm.

The 266 nm pulse which is 20 psec long is then passed through filters 9 which remove any vestiges of the 532 and 1064 nm pulses, and focused by lens 10 on sample 12. Beam splitter 11 directs a portion of the 266 nm pulse to energy meter 20. Sample 12 consists of sodium 2-naphthol-6-sulfonate dissolved in water contained in an optical quality quartz cuvette with a 2 mm pathlength. The beam size on sample 12 is ~0.1 mm. Fluorescence from the sample passes through lens 13 and is imaged through the slit of a streak camera 15 (Electrophotonics ICC-512, S-20 response) having a demonstrated resolution of 3 psec. Appropriate filters 14 are used to isolate various emission bands. A Corning 7-54 filter, which passes light below about 380 nm, and a narrow band (12.5 nm FWHM) interference filter centered at 450 nm are used to isolate the fluorescence from either the 2-naphthol-6-sulfonate species or its anion, respectively. Fluorescence streaks from camera 15 are imaged through lens 16 on a silicon vidicon array (PAR 1205D detector) 17 and recorded via an optical multichannel analyzer 18 and displayed on oscilloscope 19.

The sodium 2-naphthol-6-sulfonate (Eastman) was used without further purification. Identical results were obtained both for deionized, distilled H₂O which was carefully degassed in a N₂ atmosphere and for regular distilled water used as the solvent. The 2-naphthol-6-sulfonate concentration was kept constant at $1.0 \times 10^{-3}$ M for all runs. The pH of the solutions was adjusted by addition of reagent grade HCl or NaOH and was measured on a pH meter (Fisher Model 230) accurate to about 0.1 pH unit. The samples were typically used shortly after preparation; however, the results obtained with freshly prepared and day-old solutions were identical.

A number of runs were made to obtain measurements from which the rates of excited state protonation and deprotonation $k_f$ and $k_b$, respectively, could be determined for the reaction:

$$AH(S_1) + H_2O \underset{k_b}{\overset{k_f}{\rightleftharpoons}} A^-(S_1 0) + H_3O^+. \quad (10)$$

In its ground electronic state 2-naphthol-6-sulfonate (pK=9.1) is a very weak acid. Hence, the only ground state species present at pH≦7 will be 2-naphthol-6-sulfonate. As long as the solution is not so acidic as to make the protonation reaction fast (pH≦3), the rate of excited state proton transfer is simply determined from the risetime of the anion emission.

Figure 4:
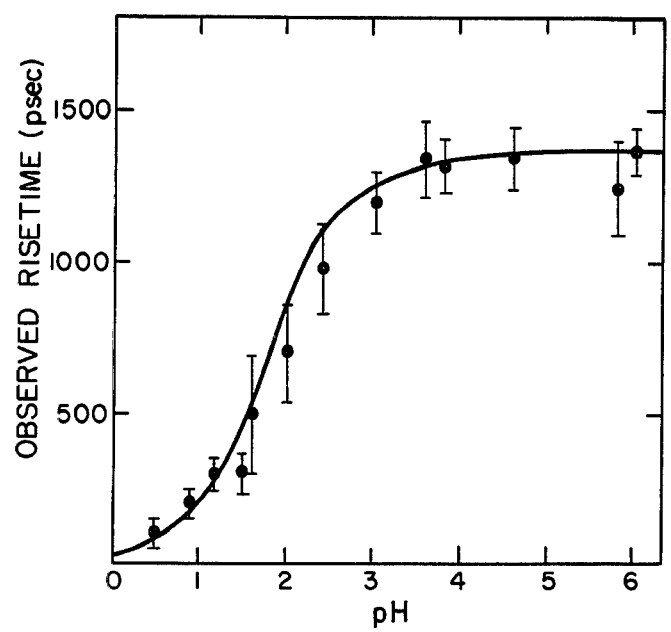
FIG. 4 shows the variation in the risetime of the emission from the 2-naphthol-6-sulfonate anion with respect to the pH of the solution.

Since the fluorescence of 2-naphthol-6-sulfonate ($\lambda_{max}$~360 nm) is considerably shifted from that of its anion ($\lambda_{max}$~430 nm), only the anion emission is recorded when 450±10 nm spectral filter 14 is placed between the sample cell 12 and the slit of streak camera 15. FIG. 4 is a plot of the risetime (10–90%) of the emission from the 2-naphthol-6-sulfonate anion versus the initial pH of the solution. Individual points represent the average of four to six separate streak camera exposures. As the solution becomes more acidic, the risetime becomes more rapid due to bimolecular protonation of the excited anion. At very high acidities, the protonation rate becomes so rapid that the temporal profile of the excited anion emission follows that of the protonated species.

By measuring the time history of both anionic and acidic species under a variety of experimental conditions and using a kinetic scheme which includes terms for the fluorescence lifetimes and quenching, the complete kinetics of the excited state protonation deprotonation are readily obtained. For 2-naphthol-6-sulfonate, $k_f = (1.02 \pm 0.3) \times 10^9$ sec$^{-1}$ and $k_b = (9.0 \pm 3) \times 10^{10}$ l-mole$^{-1}$-sec$^-$. The solid line of FIG. 4 is a fit using a kinetic model with $k_f$ and $k_b$ having these values.

From reaction (10) it is seen that one hydronium ion, H₃O⁺, is produced for each proton transfer. Since the excited state lifetime of 2-naphthol-6-sulfonate is about 10 nsec, while the proton transfer time is less than 1 nsec, excited state acid-base equilibrium is achieved. Knowing the 2-naphthol-6-sulfonate absorption coefficient at 266 nm ($\epsilon$=2000 l/mole-cm), its excited state pK value 1.9), the ultraviolet pulse energy (typically 30 μJ), and the excitation geometry (typically 0.1 mm), the H₃O⁺ is readily shown to have increased by more than $10^{-4}$ M. Thus, with an initial solution pH of 7, the 20 psec pulse of 266 nm ultraviolet radiation rapidly modulates or jumps the pH to 4. The time scale of the pH jump is given by the subnanosecond proton transfer rate. The pH returns to its previous value on a time scale greater than or equal to the excited state lifetime since it is the protonation rate of ground state anions which determine how rapidly the ground state acid-base equilibrium is reestablished.

Figure 5:
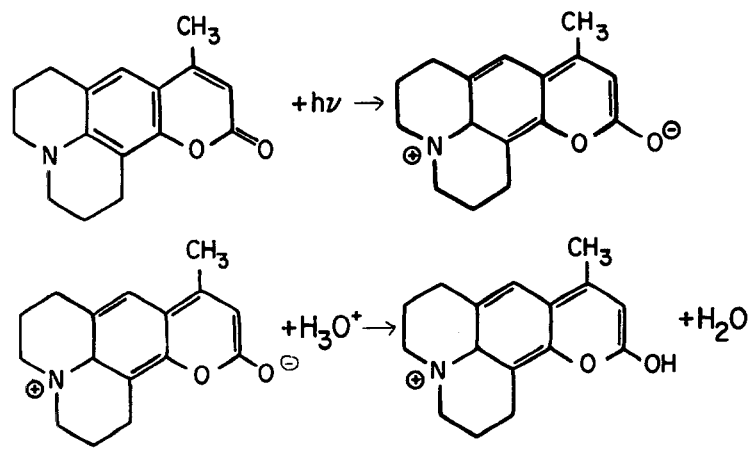
FIG. 5 is a schematic representation of reaction (11) set forth in the specification.

A pH jump from more acidic to more basic is demonstrated using coumarin 102 as a jump molecule. In coumarin 102, unlike many of the other coumarin derivatives, protonation does not occur on the amino group in the ground state due to geometrical reasons. Rather, in the first excited singlet state the molecule becomes strongly dipolar (see FIG. 5) and in particular the carbonyl group becomes very basic. A proton attaches at the carbonyl site by the reaction

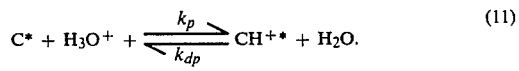

$$C^* + H_3O^+ \underset{k_{dp}}{\overset{k_p}{\rightleftharpoons}} CH^{+*} + H_2O. \quad (11)$$

Here $K_p$ is the protonation rate constant and $k_{dp}$ is the deprotonation rate constant. Emission from the protonated form, $CH^{+*}$, appears between 500 and 700 nm, peaking at 520 nm, whereas the natural form, $C^*$, emits from 420 to 600 nm, peaking at 470 nm.

Experimental runs utilized laser grade coumarin 102 (Eastman) which was maintained at a concentration of $1.0 \times 10^{-3}$ M in a 1:1 $H_2O$:ethanol solvent. Deionized, distilled water and reagent grade ethanol were used for all of the runs. The solution pH was varied by the addition of reagent grade HCl and measured to an accuracy of 0.05 pH unit with a pH meter (Markson 90). The apparatus of FIG. 3 was modified to the extent that ADP crystal 8 was replaced by a KDP sum frequency generator to produce 355 $\mu$m radiation which excited the sample. Filter 9 was either a 435 nm interference filter or a Corning 2-62 filter to isolate fluorescence from coumarin 102 and its cation, respectively.

The experimental runs were made to obtain measurements of the time history of both species under a variety of experimental conditions. From these measurements, $k_p$ was determined to be $(1.6 \pm 0.3) \times 10^{10}$ l-mole$^{-1}$-sec$^{-1}$. During the excited state lifetime the amount of deprotonation is very small and hence has a negligible effect on the reaction kinetics. The excited state lifetime of the coumarin 102 is $3.3 \pm 0.3$ nsec, and as a consequence excited state acid-base equilibrium is not achieved in this system.

Additional runs at concentrations near $10^{-3}$ M showed no evidence of quenching of excited states. This, coupled with the availability of the 355 nm pulses having an energy of $>1$ mJ and the measured excited state protonation constant, indicates that the irradiation produces a pH jump from 4 to 4.1. The smaller pH jump in this system compared to that in the 2-naphthol-6-sulfonate system is readily explainable by the facts that excited state acid-base equilibrium is not achieved and the reaction is bimolecular as opposed to unimolecular in the 2-naphthol-6-sulfonate system.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable other skilled in the art to best utilize the invention in various embodiments and with various modifications as are suited to the particular use contemplated. It is intended that the scope of the invention be defined by the claims appended hereto.

What we claim is:

1. A method for rapidly changing the pH of a solution which comprises:
   (a) forming a solution of a compound selected from those which exhibit substantial shifts in pK values when electronically excited by electromagnetic radiation of an appropriate frequency and which have excited state lifetimes substantially longer than the time required to establish an excited state acid-base equilibrium in said solution, and
   (b) irradiating said solution with electromagnetic radiation having said appropriate frequency and an intensity sufficient to produce the concentration of excited state species required for the desired pH change.

2. The method of claim 1 wherein the pH of said solution is adjustable to a desired value before irradiation by the addition of an appropriate amount of a strong acid or strong base.

3. A method of rapidly initiating an acid or base catalyzed reaction which comprises:
   (a) forming a solution of (i) the reactants which undergo said reactions, and (ii) a compound which is substantially nonreactive with said reactants in either its ground state or its excited state and which on electronic excitation exhibits a substantial pK change in the direction required to initiate said reaction,
   (b) adjusting the pH of said solution to be near but not at that at which said reaction occurs, and
   (c) irradiating said solution with electromagnetic radiation having an appropriate frequency and an intensity sufficient to produce a concentration of excited species from said compound at which the pH of said solution is changed sufficiently to initiate said reaction.

* * * * *